(12) United States Patent
Yoon et al.

(10) Patent No.: US 8,908,721 B2
(45) Date of Patent: Dec. 9, 2014

(54) ENVIRONMENTALLY STABLE OPTICAL FIBER MODE-LOCKED LASER GENERATING DEVICE HAVING AN ACHROMATIC QUARTER WAVE PLATE

(75) Inventors: Tai-Hyun Yoon, Seoul (KR); Gwang-Hoon Jang, Incheon (KR)

(73) Assignee: Korea University Holdings Co., Ltd., Seoul (KR)

( * ) Notice: Subject to any disclaimer, the term of this patent is extended or adjusted under 35 U.S.C. 154(b) by 353 days.

(21) Appl. No.: 13/516,949

(22) PCT Filed: Dec. 15, 2010

(86) PCT No.: PCT/KR2010/008987
§ 371 (c)(1),
(2), (4) Date: Aug. 24, 2012

(87) PCT Pub. No.: WO2011/074877
PCT Pub. Date: Jun. 23, 2011

(65) Prior Publication Data
US 2012/0320934 A1   Dec. 20, 2012

(30) Foreign Application Priority Data

Dec. 18, 2009   (KR) .................. 10-2009-0127134

(51) Int. Cl.
*H01S 3/30* (2006.01)
*H01S 3/11* (2006.01)
*H01S 3/067* (2006.01)
*H01S 3/10* (2006.01)
*H01S 3/08* (2006.01)

(52) U.S. Cl.
CPC ........... *H01S 3/1118* (2013.01); *H01S 3/10061* (2013.01); *H01S 3/08054* (2013.01); *H01S 3/0675* (2013.01); *H01S 3/06712* (2013.01)
USPC ......... 372/6; 372/18; 372/45.013; 372/50.11; 372/50.23; 372/70; 372/98

(58) Field of Classification Search
CPC . H01S 3/0675; H01S 3/1118; H01S 3/06712; H01S 3/10061; H01S 3/08054
USPC ......... 372/6, 18, 45.013, 50.11, 50.23, 70, 98
See application file for complete search history.

(56) References Cited

U.S. PATENT DOCUMENTS 7,233,607 B2 * 6/2007 Richardson et al. ............ 372/25
2010/0296529 A1 * 11/2010 Andersen et al. ................. 372/6

FOREIGN PATENT DOCUMENTS

JP          2008172166 A  *  7/2008  ................ H01S 3/06

*Primary Examiner* — Yuanda Zhang
(74) *Attorney, Agent, or Firm* — William Park & Associates Patent Ltd.

(57) ABSTRACT

An Environmentally stable optical fiber mode-locked laser generating device having an achromatic quarter wave plate is disclosed. An optical fiber unit is formed of a polarization maintaining (PM) optical fiber, and a Bragg grating is formed on a first region from one end in direction to the other end, a gain material is doped on a core of a remaining second region. An optical coupling unit provides a pump laser input to one end of the optical fiber unit, and outputs a laser input from the optical fiber unit. A lens unit converts a laser output from the other end of the optical fiber unit and focuses the laser on a certain regime. A polarization control unit includes an achromatic quarter wave plate (AQWP) which is disposed between the lenses constituting the lens unit and made by laminating two quarter wave plates (QWPs) such that fast-axes of the QWPs are orthogonal to each other, and controls mode-locking of the laser and spectral bandwidth by adjusting an angle of the AQWP with respect to a fast-axis or a slow-axis of the optical fiber unit. A saturable absorbing unit saturably absorbs and reflects the laser passed through the second lens, resulting in mode-locking.

20 Claims, 9 Drawing Sheets

FIG. 15

ENVIRONMENTALLY STABLE OPTICAL FIBER MODE-LOCKED LASER GENERATING DEVICE HAVING AN ACHROMATIC QUARTER WAVE PLATE

TECHNICAL FIELD

The present invention relates to a laser generating device, and more particularly, to an environmentally stable optical fiber mode-locked laser generating device having an achromatic quarter wave plate (AQWP).

BACKGROUND ART

Diode-pumped picosecond Ytterbium (Yb)-doped fiber lasers with a repetition rate over 100 MHz that seed a fiber amplifier have attracted interests for their potential uses in the optical frequency metrology. The higher the repetition rate, the more power per mode is delivered in the optical frequency comb. In addition, High-energy picosecond Yb-doped fiber lasers with pulse energies over 1 nJ in the normal-dispersion laser cavity have also been actively researched. Furthermore, the picosecond normal-dispersion Yb-doped fiber lasers have been applied to make fiber-based femtosecond lasers with dechirped pulse-width on the order of 100 fs. Since the output pulses acquired in the normal-dispersion cavity have linear positive chirp, the external compression techniques by using a photonic crystal fiber or a gating pair have been successfully applied.

Environmentally stable operation of the mode-locked fiber lasers by employing polarization maintaining (PM) cavity-components only has been a central issue for the practical long-term operation of the fiber lasers. In the early studies, a Faraday rotator/polarizer pair in the Erbium (Er)-doped fiber laser or an acousto-optic modulator/grating pair for frequency shifted feedback in the Yb-doped fiber laser has been used to make stable single-polarization fiber lasers. Recently, a single-polarization oscillation in a sigma-type cavity was realized by incorporating a non-PM Yb-doped fiber and a hollow core photonic crystal fiber for the stretched-pulse operation.

However, environmentally stable PM Yb-doped fiber lasers in the normal-dispersion regime have only recently been demonstrated with relatively low repetition rates either in a linear standing-wave cavity or a ring traveling-wave cavity. This is partly due to the difficulties to implement the nonlinear polarization rotation (NPR) technique that is widely used in the non-PM fiber lasers. Thus, self-starting mode-locking in the Yb-doped fiber laser has usually been achieved with a semiconductor saturable absorber mirror (SAM). The NPR technique was implemented in a linear cavity by using a Faraday mirror/PM coupler pair. An environmentally stable all-normal-dispersion PM Yb-doped fiber laser with a repetition rate over 100 MHz and a pulse energy over 1 nJ was not reported yet.

DISCLOSURE

Technical Problem

The present invention is directed to an environmentally stable optical fiber mode-locked laser generating device having an AQWP capable of generating a laser with repetition rate over 100 MHz as well as 100 MHz and pulse energy over 1 nJ.

Technical Solution

The present invention provides an optical fiber mode-locked laser generating device, including: a first pump laser generating unit for generating a pump laser with a predetermined wavelength; an optical fiber unit having an optical fiber of which a first region is formed of a Bragg grating from one end of an optical fiber in direction to the other end and of which a second region, the remaining part of the optical fiber, is doped with a gain material in a core of the optical fiber; a first optical coupling unit for providing a pump laser input from the pump laser generating unit to one end of the optical fiber unit, and outputting a mode-locked laser input from the optical fiber unit; a lens unit including a first lens configured to generate a parallelized laser by changing a path of the laser output from the other end of the optical fiber, and a second lens configured to focus the parallelized laser passed through the first lens on a certain area by changing a path of the parallelized laser; a polarization control unit including an achromatic quarter wave plate (AQWP) which is disposed between the first lens and the second lens and made by laminating two quarter wave plates (QWPs) such that a fast-axis of one QWP is orthogonal to a fast-axis of the other QWP, and controlling polarization of the parallelized laser and spectral filtering bandwidth by adjusting an angle of the AQWP with respect to a fast-axis or a slow-axis of the optical fiber unit; and a saturable absorbing unit saturably absorbing and reflecting the parallelized laser passed through the second lens.

Advantageous Effects

An environmentally stable optical fiber mode-locked laser generating device according to the present invention generates a single-polarization linear laser in an optical fiber cavity with normal-dispersion by using the AQWP. The single-polarization PM doped optical fiber mode-locked linear laser has a pulse width of 2 ps, a repetition rate of 117 MHz, and a pulse energy of 1 nJ. The AQWP of the present invention controls the polarization states of the electric field inside of the cavity and maintains the mode-locking state of the normal-dispersion cavity by controlling the spectral filtering bandwidth of the laser. And depending on the fast-axis angle of the AQWP off the slow-axis of the PM Yb-doped fiber, two distinct mode-locking states with different polarization states has been analyzed. The fundamental Radio Frequency (RF) carrier frequency of the single-polarization Yb-doped fiber laser reveals the passive stability of $3.8 \times 10^{-8}$ at 1 second gate time and the phase noise spectral density of −95 dBc/Hz at offset frequency of 10 Hz (−140 dBc/Hz at 4 MHz) without active environmental isolation. According to the present invention, a ultra-stable single-polarization picosecond Yb-doped fiber laser with a high repetition rate greater than 100 MHz and a pulse energy of 1 nJ can be generated. Furthermore, the entire scheme of the laser generating device can be simplified and the components of the laser generating device can be reduced, by controlling the polarization states of the laser and performing the spectral filtering using the AQWP.

MODE FOR INVENTION

Hereinafter, an environmentally stable optical fiber mode-locked laser generating device having an AQWP according to the present invention will be described in detail. Although a laser generating device using Yb-doped fiber as a gain material is suggested, the gain material can be one of Yb, Er, and their composition.

Self-starting mode-locking is achieved by using a SAM and an AQWP. The Yb-doped mode-locked fiber laser generating device according to the present invention, the AQWP controls not only the polarization states of the intra-cavity electric field but also the spectral filtering bandwidth. By rotating the fast-axis angle of the AQWP off the slow-axis of the PM Yb-doped fiber, two distinct mode-locking regimes with different polarization states can be generated. A single-polarization PM Yb-doped fiber laser with a repetition rate of 117 MHz and a pulse energy of 1 nJ with a duration of 2 ps can be generated by this. The fundamental RF carrier frequency of the linearly-polarized Yb-doped mode-locked fiber laser exhibits a passive stability of $3.8\times10^{-8}$ at 1 second averaging time and a phase noise of −95 dBc/Hz at 10 Hz offset frequency (−120 dBc/Hz at 10 kHz offset frequency) without active environmental isolation.

Figure 1:
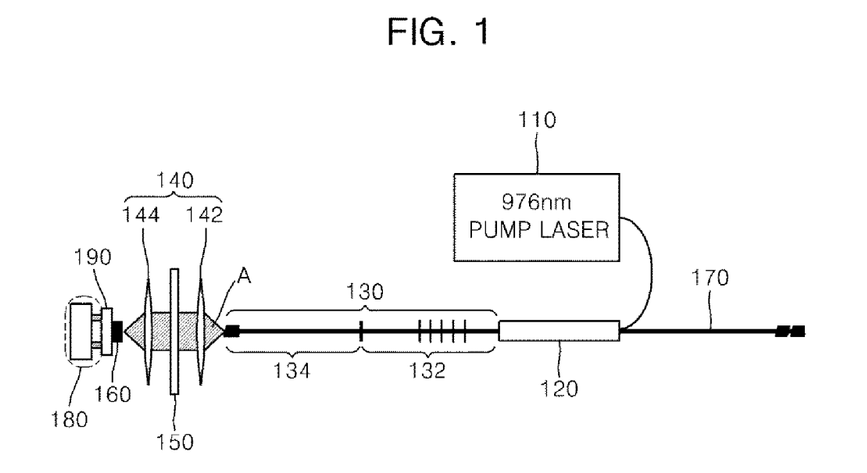
FIG. 1 illustrates a detailed structure of an optical fiber laser generating device according to an exemplary embodiment of the present invention.

FIG. 1 illustrates a detailed structure of an optical fiber laser generating device according to an exemplary embodiment of the present invention.

Referring to FIG. 1, the optical fiber laser generating device according to an exemplary embodiment of the present invention includes a pump laser generating unit 110, an optical coupling unit 120, an optical fiber unit 130, a lens unit 140, a polarization control unit 150, a saturable absorbing unit 160, and an optical output unit 170.

The pump laser generating unit 110 generates a pump laser having the specific wavelength. For example, the pump laser generating unit 110 can be implemented with a distributed-feedback single-polarization diode laser providing a maximum output power of 460 mW at wavelength of 976 nm. The pump laser output from the pump laser generating unit 110 is input to the optical coupling unit 120 through an optical transmitting material such as optical fiber.

The optical coupling unit 120 provides the pump laser input from the pump laser generating unit 110 to an optical fiber composing the optical fiber unit 130 and outputs a laser input from the optical fiber unit 130 through the optical output unit 170. The optical coupling unit 120 can be implemented with a thin film PM wavelength division multiplexing (WDM) coupler.

A first region 132 of the optical fiber unit 130, from one end connected to the optical coupling unit 120 to some point in direction to the other end, is consisted of a fiber Bragg grating (FBG) and a second region 134 of the optical fiber unit 130, a remaining part of the optical fiber unit 130 except the first region 132, is consisted of an optical fiber of which core is highly Yb-doped for having absorption of 250 dB/m at wavelength of 976 nm. The optical fiber unit 130 can be implemented with a PM optical fiber of 50 cm long with the mode-field diameter (MFD) of 6 μm and group-velocity dispersion (GVD) of +0.023 ps$^2$/m. Like this, the PM optical fiber with Yb-doped core is used as a gain material and coupled with a high polarization extinction ratio and low loss. In addition, the Bragg grating formed on the first region 132 of the optical fiber composing the optical fiber unit 130 is negatively or positively chirped and used as an output coupler. For example, an FBG output coupler acting as the Bragg grating formed on the first region 132 of the optical fiber composing the optical fiber unit 130 has the peak reflectivity of 15% centered at 1055 nm with spectral Gaussian bandwidth of 60 nm and the dispersion of +0.057 ps$^2$. The total dispersion of the cavity is estimated to be +0.1 ps$^2$ after taking into account dispersions of all normal-dispersion cavity components. In the mean time, by shortening the first region 132 of the single-mode fiber with the Bragg grating, the repetition rate of the laser can be made higher, resulting in higher output power per mode. On the contrary, by lengthening the first region 132 of the single-mode fiber with the Bragg grating, the repetition rate of the laser can be made lower, resulting in higher energy per pulse.

The lens unit 140 includes a first lens 142 and a second lens 144. The first lens 142 generates a parallelized laser by changing the optical pass of the laser output from the other end of the optical fiber unit 130. And the second lens 144 focuses the parallelized laser passed through the first lens 142 on a certain area by changing a path of the parallelized laser.

The polarization control unit 150 is disposed between the first lens 142 and the second lens 144 of the lens unit 140, and implemented with an AQWP. The AQWP is made by laminating two QWPs such that the fast-axis of one QWP is orthogonal to the fast-axis of the other QWP. An angle of the AQWP constituting the polarization control unit 150 is adjusted with respect to the fast-axis or the slow-axis of the optical fiber unit 130, thereby controlling polarization states of the laser and spectral filtering bandwidth.

The saturable absorbing unit 160 saturably absorbs and reflects the laser passed through the second lens 144 of the lens unit 140. The saturable absorbing unit 160 is implemented with a SAM. The SAM with an anti-resonant multi-quantum-well structure has the relatively flat reflectance of 70% in the wavelength range between 1010 nm to 1080 nm, the modulation depth of 20%, the saturation time of 500 fs, and the saturation fluence of 120 μJ/cm2, respectively. Self-starting passive mode-locking is achieved by using the combination of the AQWP 150 and the SAM (for example, SAM manufactured by the Batop GmbH) 160 attached on a supporting material 190. Meanwhile, the saturable absorbing unit 160 can be consisted of a total refection mirror coated with single-wall carbon nanotubes or diamond powder. The saturable absorbing unit 160 like this has a property that the refection rate increases in proportional to the power of an incident laser, and preferably, has a minimum reflection rate of 70% and a maximum reflection rate of 95% according to the power of incident laser. If the minimum reflection rate of the element forming the saturable absorbing unit 160 is low, a laser can be generated by raising the power of the pump laser. In the mean time, a piezo-electric transducing unit 180 can be additionally equipped behind the saturable absorbing unit 160 for controlling resonant length. The entire resonant length, i.e., the length from the first region 132 formed the Bragg grating to the SAM 160, can be controlled minutely by moving the saturable absorbing unit 160 forward and backward against the lens unit 140 according to the power of the signal imposed on the piezo-electric transducing unit 180. By controlling minutely the resonant length like this, additional stabilization of the repetition rate of the laser can be possible.

The optical output unit 170 is connected to the optical coupling unit 120 and outputs the laser input from the optical coupling unit 120. An optical amplifier can be connected to the optical output unit 170 in order to amplify the laser output from the optical output unit 170.

Figure 2:
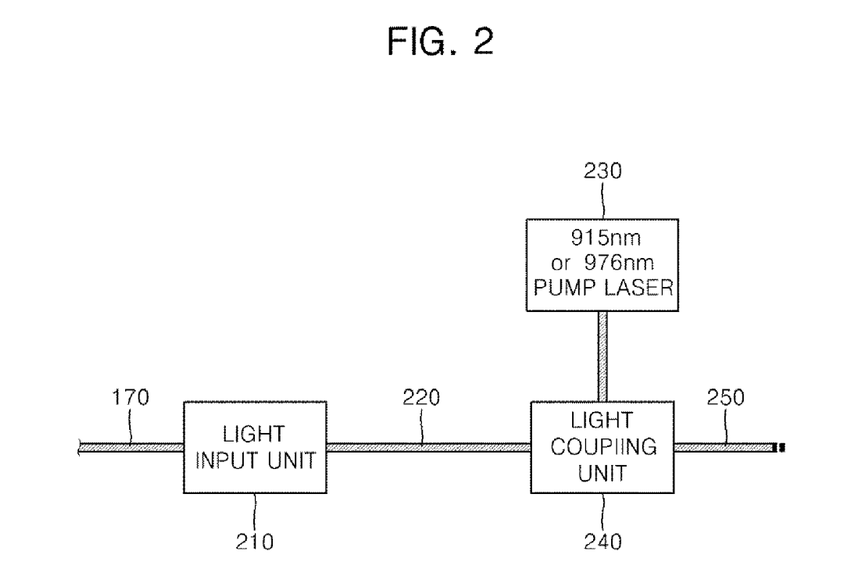
FIG. 2 illustrates a detailed structure of an optical amplifier coupled to the optical fiber laser generating device according to the exemplary embodiment of the present invention.

FIG. 2 illustrates an exemplary embodiment of the optical amplifier coupled to the optical output unit 170.

Referring to FIG. 2, the optical amplifier includes a light input unit 210, an amplifying unit 220, a pump laser generating unit 230, a light coupling unit 240, and light output unit 250. The light input unit 210 is coupled to the optical output unit 170 of the optical fiber laser generating device according to the present invention optically. The laser generated by the optical fiber laser generating device according to the present invention is input to the light input unit 210. Each ends of the amplifying unit 220 are connected to the light input unit 210 and the light coupling unit 240 optically, respectively. The amplifying unit 220 is formed of an optical fiber of which core is doped with Yb, Er, or their composition as a gain material. Preferably, the optical fiber composing the amplifying unit 220 is a double cladding optical fiber in order to endure the laser making a round trip inside the optical fiber with high energy. The pump laser generating unit 230 generates a pump laser to be amplified and provides the pump laser to the light coupling unit 240. The pump laser generated by the pump laser generating unit 230 has a wavelength of 976 nm or 915 nm. The light coupling unit 240 provides the pump laser input from the pump laser generating unit 230 to the optical fiber composing the amplifying unit 220, and outputs the laser input from the amplifying unit 220 through the light output unit 250. The light coupling unit 240 can be formed of a coupler in a type of thin film PM WDM or a dichroic coated beam divider.

Figure 3:
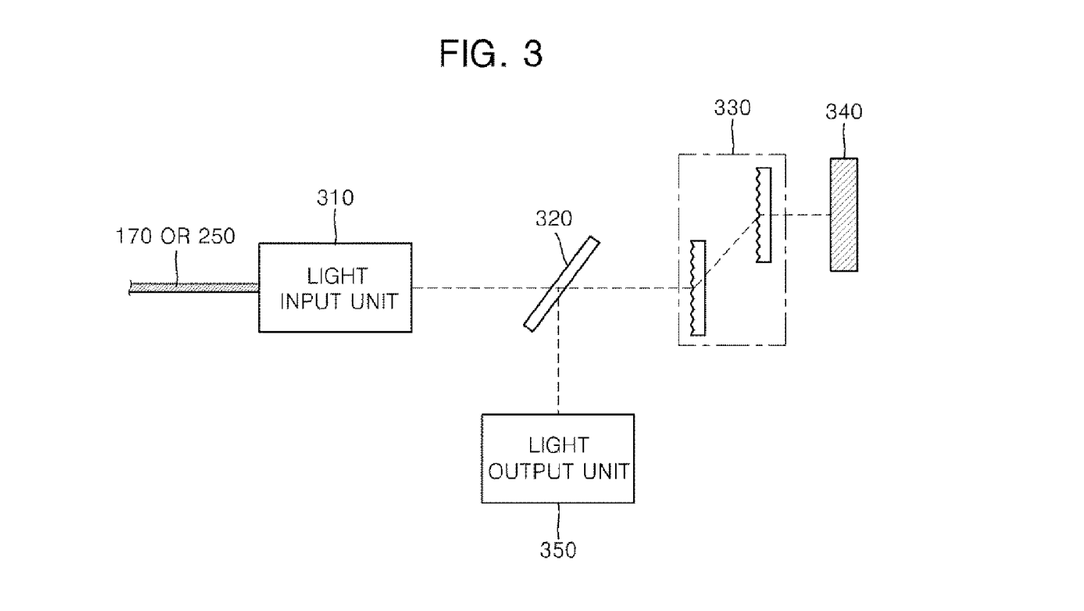
FIG. 3 illustrates a detailed structure of a light converter coupled to the optical fiber laser generating device according to the exemplary embodiment of the present invention or the optical amplifier.

Meanwhile, a light converter converting positively chirped picosecond pulses to femtosecond pulses by adopting negative chirp can be additionally coupled to the optical output unit 170 of the optical fiber laser generating device according to the present invention or the light output unit 250 of the amplifying unit shown in FIG. 2. FIG. 3 illustrates an exemplary embodiment of the light converter. Referring to FIG. 3, the light converter includes a light input unit 310, a light dividing unit 320, a light converting unit 330, a light reflecting unit 340, and a light output unit 350. The optical output unit 170 of the optical fiber laser generating device according to the present invention or the light output unit 250 of the amplifying unit is coupled to the light input unit 310 optically, and the laser generated by the optical output unit 170 of the optical fiber laser generating device according to the present invention or amplified by the optical amplifying unit shown in FIG. 2 is input through the light input unit 310. The light dividing unit 320 provides the picosecond laser input from the light input unit 310 to the light converting unit 330, and provides the femtosecond laser input from the light converting unit 330 to the light output unit 350. The light converting unit 330 is formed of two Bragg gratings and converts the picosecond laser to the femtosecond laser. The light reflecting unit 340 is positioned beside the light converting unit 330 and reflects the laser totally. The light output unit 350 outputs the femtosecond laser input from the light dividing unit 320. By using the light converter described above, the picosecond laser can be easily converted to the femtosecond laser without changing the characteristics of the picosecond laser.

The critical element for generating the environmentally stable single-polarization Yb-doped fiber laser is the AQWP 150 inserted in the open space (i.e., the open space between the first lens 142 and the second lens 144 forming the lens unit 140) of the linear laser generating device shown FIG. 1. The AQWP 150 is a special form of the QWP having two multiple-order QWPs made of different birefringence crystals. Two QWPs are mounted such that the slow-axis of one crystal is parallel to the fast-axis of the other one to achieve a ultra-broad band operation wavelength over 300 nm.

Figure 4:
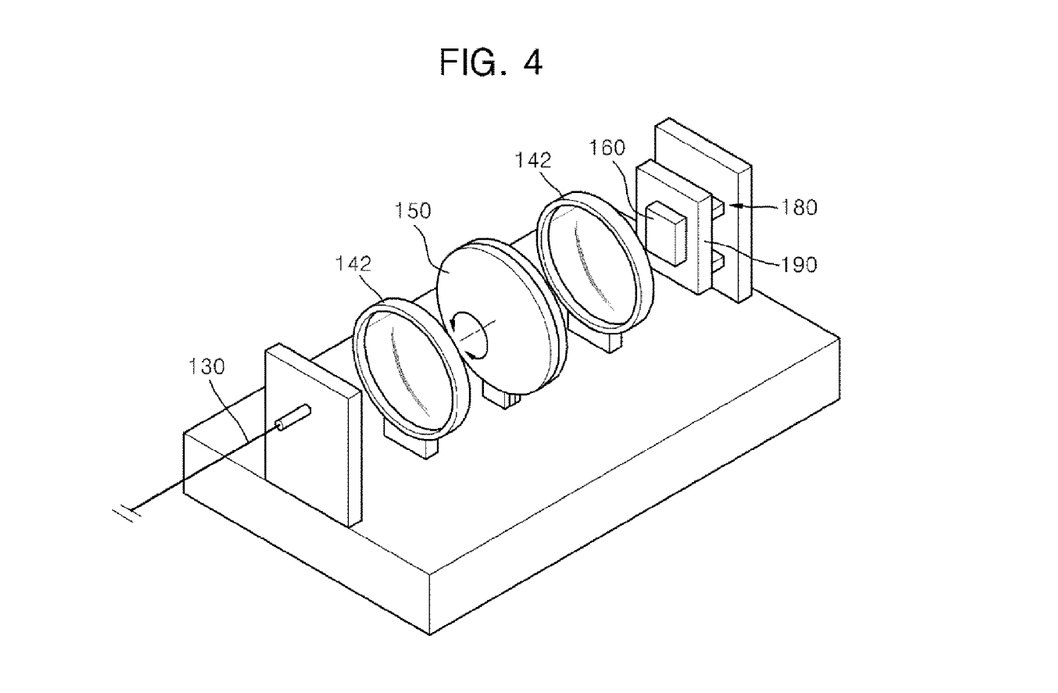
FIG. 4 illustrates detailed structures of a lens unit and a polarization control unit of the optical fiber laser generating device according to an exemplary embodiment of the present invention.

FIG. 4 illustrates detailed structures of a lens unit 140 and a polarization control unit 150 of the optical fiber laser generating device according to the exemplary embodiment of the present invention.

Referring to FIG. 4, the laser transmitted through the optical fiber unit 130 is output along the optical axis of the first lens 142 and the second lens 144 forming the lens unit 140. The AQWP 150 composing the polarization control unit 150 is disposed between the first lens 142 and the second lens 144 of the lens unit 140, and can be moved in direction to the optical axis. Also, the AQWP 150 rotates about the optical axis and controls the polarization of the laser transmitted through the optical fiber unit 130.

Hereinafter, the function of the AQWP 150 for controlling the polarization of the intra-cavity electric field is described.

The Jones vector that represents the intra-cavity electric field at the point A in FIG. 1 is defined as $[E_x, E_y]^t$, where $E_x(E_y)$ is the electric field oscillating along the slow axis of the PM Yb-doped optical fiber and t stands for the transpose. Then, an achromatic birefringence retardation plate may have the Jones matrix $M_{br}$ represented in the following equation.

$$M_{br} = \begin{bmatrix} e^{i\frac{\varphi(\lambda)}{2}} & 0 \\ 0 & e^{-i\frac{\varphi(\lambda)}{2}} \end{bmatrix}, \quad [\text{Equation 1}]$$

$$\varphi(\lambda) = \frac{2\pi}{\lambda}[(n_e^Q(\lambda) - n_o^Q(\lambda))l_\eta + (n_n^M(\lambda) - n_p^M(\lambda))l_m],$$

where, $\phi(\lambda)$ denotes a phase difference generated by two components of the electric field, $\lambda$ denotes a wavelength, $n_e^Q(\lambda)$ and $n_e^Q(\lambda)(n_e^Q(\lambda)$ and $n_e^Q(\lambda))$ denote, respectively, wavelength dependent refractive indices of the extra-ordinary and ordinary beams of the crystalline quartz (MgF$_2$) retardation plate, and $l_q$ ($l_m$) is the thickness of the crystalline quartz (MgF$_2$).

If $\phi(\lambda)=m\pi/2$ (m=1, 3, 5, . . . ), the retardation plate becomes an AQWP, especially for n=1, it becomes a zeroth-order AQWP.

Now, by using the Jones matrix of the reflection mirror $$M_{rm} = \begin{bmatrix} 1 & 0 \\ 0 & -1 \end{bmatrix},$$

the Jones vector of the intra-cavity electric field at the point A that traveled forth-and-back through the AQWP 150 after reflecting off the SAM is calculated. The PM Yb-doped fiber 134 acts as a linear polarizer so that the initial intra-cavity electric field is assumed to have a Jones vector $[E_x, E_y]^t=[1, 0]^t$. The four specific rotation angles $\theta$ of the fast-axis of the QWP 150 off the slow-axis of the PM Yb-doped fiber 134 are assumed as $\theta=-\pi/4$ rad, $\theta=0$ rad, $\theta=+\pi/4$ rad, and $\theta=+\pi/2$ rad, shown in following Table 1, respectively.

TABLE 1

| $\theta$ (rad) | Jones vector | polarization state | −3 dB bandwidth (nm) | output polarization |
|---|---|---|---|---|
| $-\frac{\pi}{4}$ | $[0, -1]^t$ | linear orthogonal | 15 | two orthogonal |
| 0 | $[-i, 0]^t$ | linear parallel | 26 | single linear |
| $+\frac{\pi}{4}$ | $[0, +i]^t$ | linear orthogonal | 15 | two orthogonal |
| $+\frac{\pi}{24}$ | $[+i, 0]^t$ | linear parallel | 26 | single linear |

Clearly, depending on the fast-axis angle of the AQWP 150, there are distinct polarization states inside the laser cavity. For $\theta=+\pi/4$ rad, the AQWP 150 acts as a quarter-wave plate so that the electric field at the point A after round-trip has a linear but orthogonal polarization with Jones vectors $[0, i]^t$. In this case, the electric field inside the Yb-doped optical fiber propagates with the polarization orthogonal to the slow-axis, thus parallel to the fast-axis, keeping the same polarization state back to the point A. After two complete round-trips through the whole linear laser cavity, the laser can have the same linear polarization with the initial intra-cavity electric field. Therefore, when the AQWP 150 acts as an QWP, the output beam of the laser through the FBG output coupler 132 has two orthogonal polarizations with halved repetition rate since the effective cavity length is doubled. On the other hand, for angles $\theta=\pm\pi/2$ rad, the AQWP 150 acts just as a birefringence retardation plate so that the electric field at the point A after round-trip becomes linearly-polarized with Jones vectors $[i, 0]^t$ parallel to the initial intra-cavity electric field along the slow-axis of the PM Yb-doped optical fiber. Therefore, there is only single polarization component both inside and outside of the laser cavity.

Meanwhile, in the linear laser cavity, the AQWP 150 plays another important role as a broad-band spectral filter for the stabilization of mode-locking state initiated by the SAM 160 in the all-normal-dispersion regime. In this time, the spectral bandwidth of the output pulse can be grasped by using Sellmeier equations of the crystalline quartz and MgF$_2$ crystals. The transmittance of the intra-cavity electric field projected onto the slow-axis of the PM Yb-doped optical fiber 134 is governed mainly by the phase difference $\phi(\lambda)$ experienced within the AQWP 150 in Equation 1 by the two orthogonal polarization components of the intra-cavity electric field.

Figure 5:
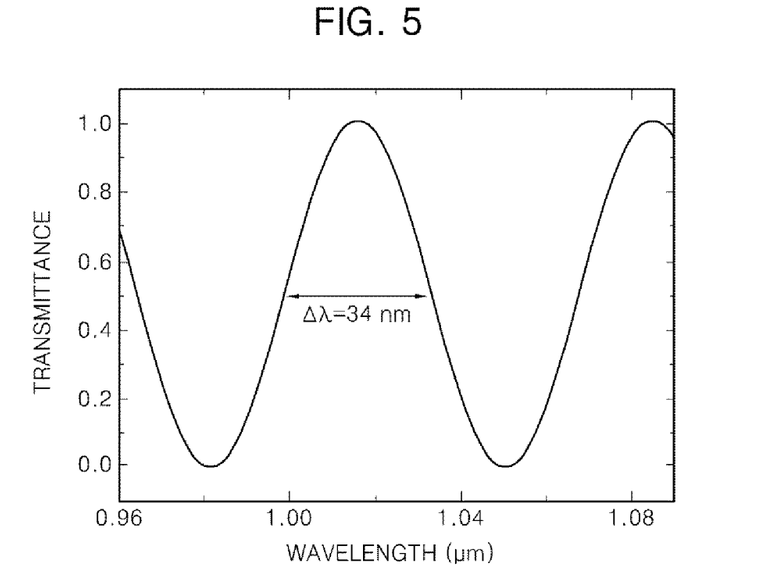
FIG. 5 illustrates a graph showing the projected transmittance of the intra-cavity electric field through the AQWP with thickness $d=l_q+l_m=1.83$ mm.

FIG. 5 illustrates a graph showing the projected transmittance T=cos $[\phi(\lambda)/2]^2$ of the intra-cavity electric field through the AQWP 150 with thickness $d=l_q+l_m=1.83$ mm. Here, $l_q=0.83$ mm and $l_m=1.0$ mm. As can be seen in FIG. 5, the AQWP 150 has a transmission curve with a 34-nm bandwidth within the gain wavelength region of the Yb-doped fiber. By changing the thickness of the AQWP 150 slightly, the transmission center wavelength and bandwidth of the transmission curve can be changed.

Figure 6:
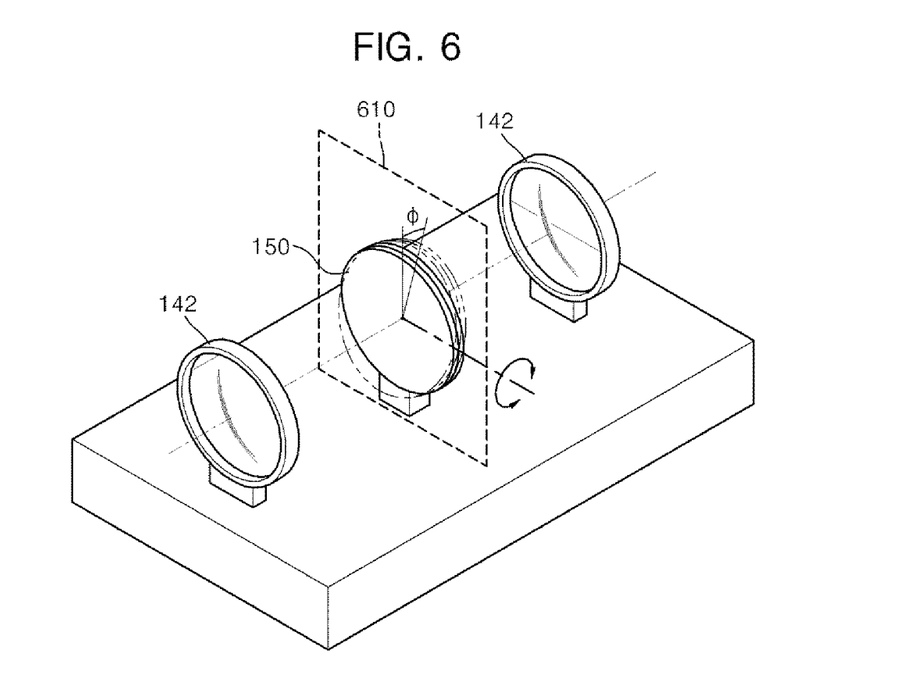
FIG. 6 illustrates the rotation states of the polarization control unit of the optical fiber laser generating device according to the exemplary embodiment of the present invention.

FIG. 6 illustrates a method for changing the thickness of the AQWP 150 without replacing the AQWP 150. Referring to FIG. 6, changing of the thickness of the AQWP 150 can be achieved by changing the angle $\phi$ of the AQWP 150 on the basis of a plane orthogonal to a line connecting the centers of the first lens 142 and the second lens 144. This means that the thickness of the AQWP 150 can be changed by changing the incidence angle q of the laser incident onto the AQWP 150 after passing through the first lens 142 and the second lens 144 so as to increase the length of the optical pass of the laser traveling inside of the AQWP 150. The AQWP 150 is installed to rotate about a line orthogonal to the line connecting the centers of the first lens 142 and the second lens 144 for changing the angle of the AQWP 150. Like this, the maximum output wavelength of the laser is changed by changing the thickness of the AQWP 150, and can be changed according to the material composing the AQWP 150. Experimentally, same effects can be obtained by changing the incidence angle of the intra-cavity electric field. Therefore, the spectral bandwidth of −3 dB of the output spectra shown in FIG. 11 can be qualitatively explained, considering the transmittance curve shown in FIG. 5 and the reduction of the reflection rate in the short wavelength region near 1020 nm.

Hereinafter, experimental results are described for looking over the characteristics of the optical fiber laser generating device according to the present invention. First, self-starting mode-locking characteristic of the laser were measured as a pump power P$_{pump}$ in the experiment.

Figure 7:
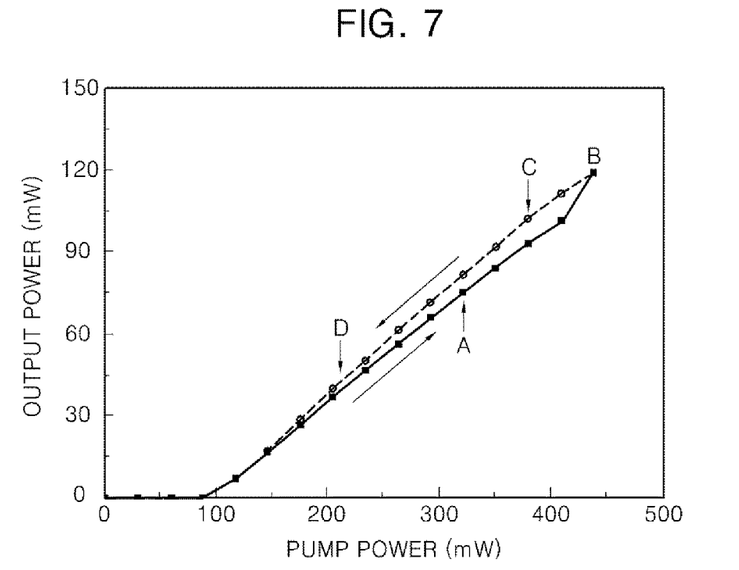
FIG. 7 illustrates a graph showing a typical output power depending on the pump power when the fast-axis of the AQWP and the slow-axis of the PM doped optical fiber are parallel.

FIG. 7 illustrates a graph showing a typical output power depending on the pump power when the fast-axis of the AQWP 150 and the slow-axis of the PM doped optical fiber 130 are parallel. Referring to FIG. 7, as increasing the pump power, a continuous-wave threshold is reached first at P$_{pump}$=80 mW and the passive mode-locking threshold is reached at P$_{pump}$=330 mW (point A). The mode-locked state is maintained until the available pump power of P$_{max}$=440 mW (point B) and the mode-locked laser shows a hysteresis behavior when the pump power is decreasing from P$_{max}$. And the mode-locking state is ceased at P$_{pump}$=220 mW (point D). In the experiment, the environmentally stable mode-locked Yb-doped fiber laser was operated at the point C, where the output power of the laser is 100 mW at P$_{pump}$=380 mW with optical-to-optical conversion efficiency of 26%.

Figure 8:
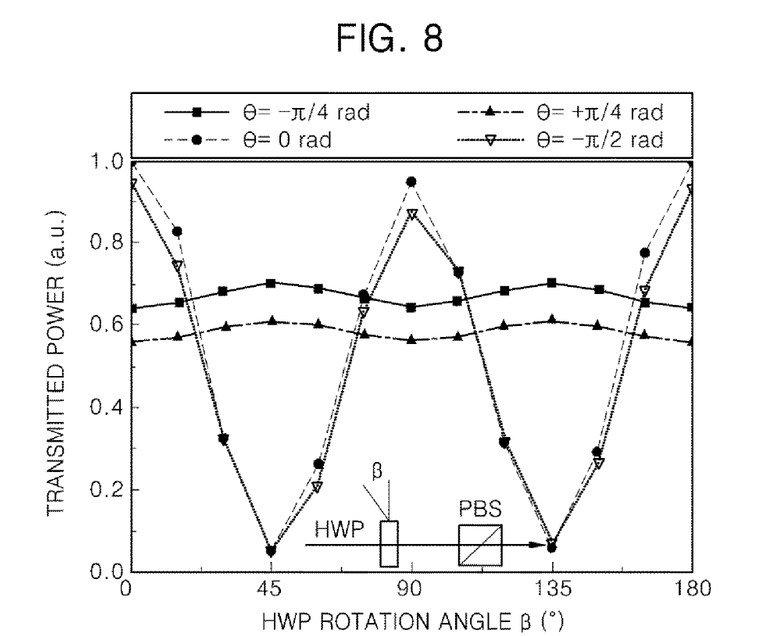
FIG. 8 illustrates a graph showing the result of analyzing the polarization of the output beam of the laser.

Next, the polarization state of the output beam depending on the fast-axis angle $\theta$ of the AQWP 150 is analyzed. FIG. 8 illustrates the result of analyzing the polarization of the output beam of the laser. For this measurement, the slow-axis of the PM output optical fiber 130 was aligned to the axis of the polarization beam splitter (PBS) and rotated the fast-axis angle β of the half-wave plate (HWP). The graphs illustrated by rectangles and triangles among the graphs shown in FIG.

8 indicate the output powers of the laser from laser cavities with θ=−π/4 rad and θ=+π/4 rad, respectively. Looking into the graphs illustrated by rectangles and triangles, both points show similar weak dependence on the HWP rotation angle and they have opposite magnitudes at the other exit of the PBS, confirming that the laser beam has two orthogonal polarization components. For θ=±π/4 rad, the AQWP 150 acts as a zeroth-order QWP so that there are two orthogonal linear polarization components inside the laser cavity and thus in the laser output beam. On the other hand, when the laser cavity is operated with θ=0 rad (circle) or θ=π/2 rad (inverse-triangle), respectively, a strong dependence of the detected power on the HWP rotation angle β was observed, confirming that the laser beam is linearly polarized. At these two angles of θ, almost the same single-polarization state was observed with a polarization extinction ratio over 100, which strongly supports that the laser oscillates always in a single linearly-polarized state along the slow-axis of the PM Yb-doped optical fiber.

Figure 9:
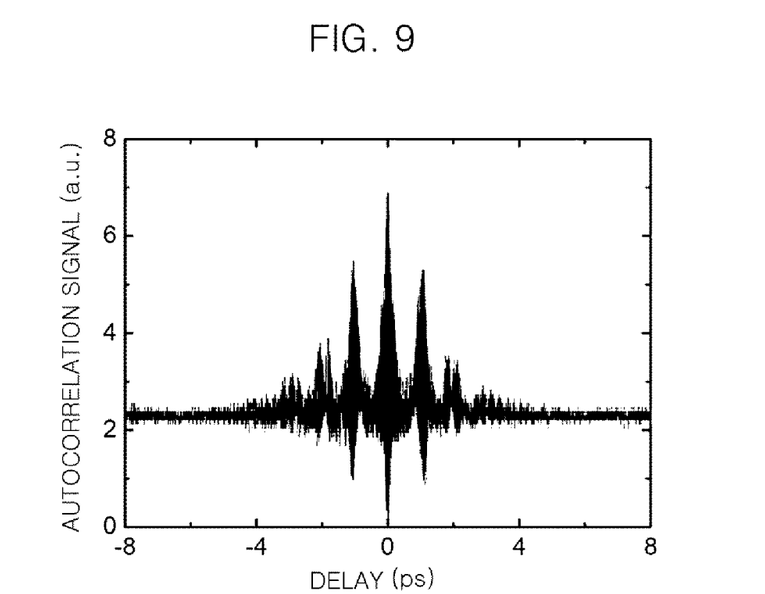
FIG. 9 illustrates a typical interferometric field autocorrelation signal of the single polarization Yb-doped optical fiber laser.

FIG. 9 illustrates a typical interferometric field autocorrelation signal of the single polarization Yb-doped optical fiber laser. Referring to FIG. 9, the autocorrelation signal is a form of a hyperbolic curve with the pulse width of 2 ps. The field autocorrelation signal is measured after propagating 1-m long PM optical fiber spliced to the PM FBG output coupler.

Figure 10:
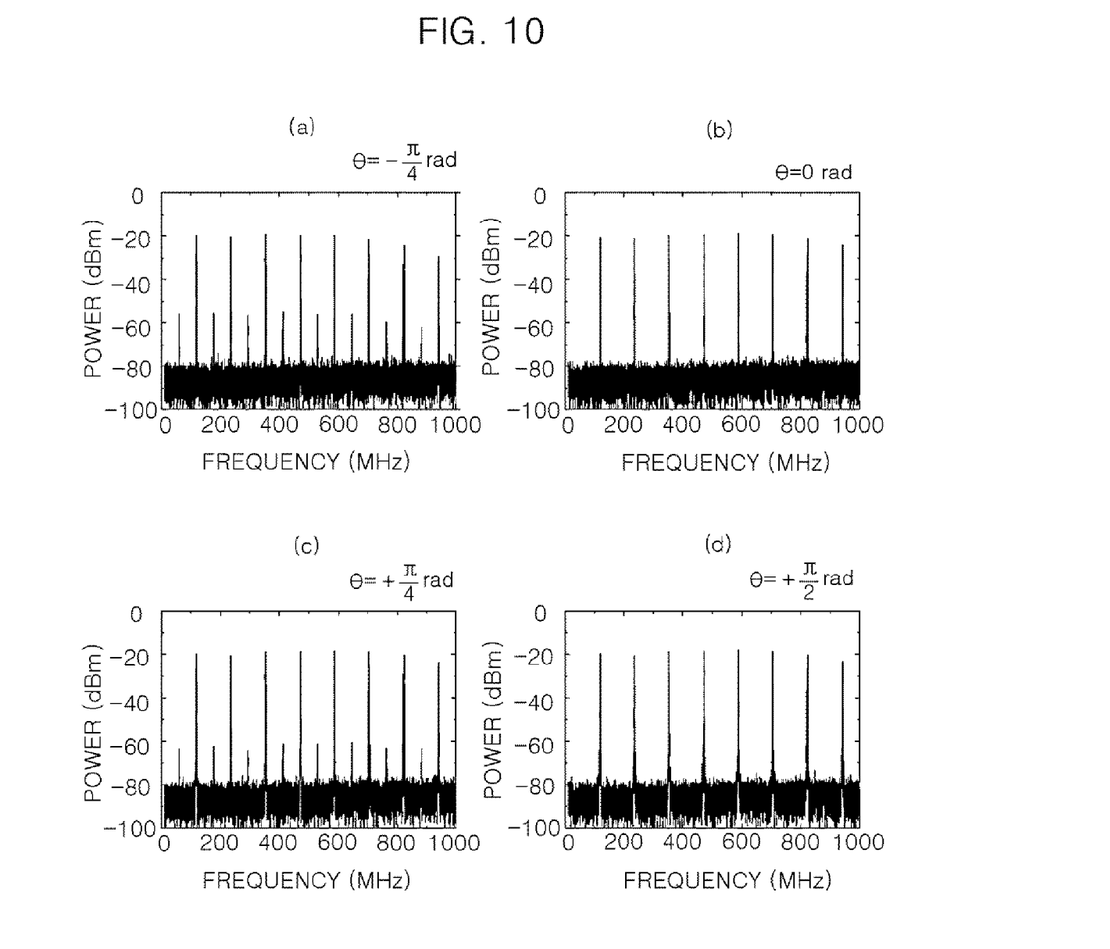
FIG. 10 illustrates RF spectra observed at the output beams of the lasers generated by the laser cavities with different angles of the AQWP.

FIG. 10 illustrates RF spectra observed at the output beams of the lasers generated by the laser cavities with four different angles of the AQWP. They were measured by a RF spectrum analyzer with the resolution bandwidth (RWB) of 300 kHz. The RF spectra also have different patterns between the laser beams generated from the laser cavity with θ=±π/4 rad and θ=0 rad and +π/2 rad. It is easy to understand the RF spectra corresponding to the single-polarization laser beams with θ=0 rad or θ=+π/2 rad. In this case, the laser cavity has only a single-polarization component, therefore, the RF spectra show harmonics of the fundamental repetition rate $f_{rep}$=1/τc=117 MHz only. Here, τc is the cavity round-trip time. On the other hand, for the laser cavity with θ=±π/4 rad, two linearly-polarized intra-cavity electric fields oscillate simultaneously with the effective cavity length of 176 cm, resulting in the half-harmonic spectra of the repetition rate. In other words, after a single laser pulse with linear polarization couples out the laser cavity, a delayed pulse is coupling out after exactly the cavity round-trip time τc=8.5 ns later. The trailing pulse then has to have orthogonal polarization relative to the advanced one due to the polarization flip of π/2 by the AQWP. Since the intra-cavity electric field may have two orthogonal polarization components at the time of mode-locking, there are always pulses in series with orthogonal polarizations in the laser output beam. Therefore, there may be slight polarization mixing across the two orthogonal polarization modes when the AQWP acts as a zeroth-order QWP, resulting in the enhanced beat notes at the harmonics of the repetition rate.

Figure 11:
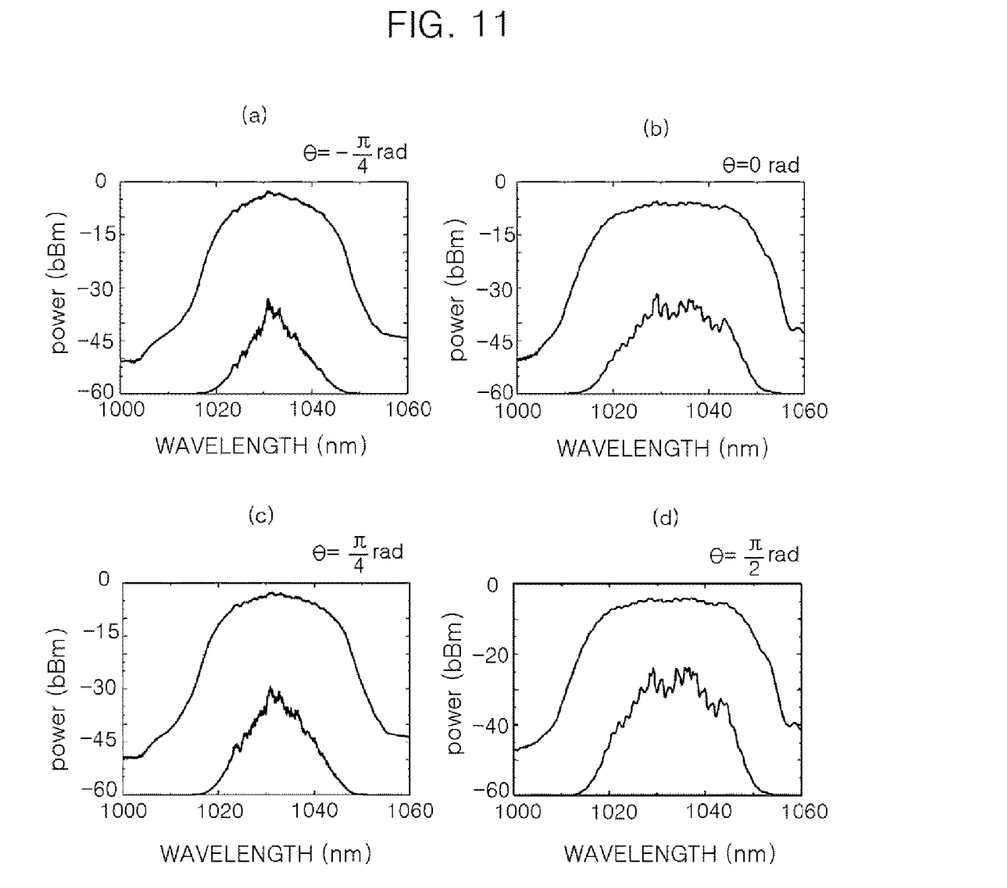
FIG. 11 illustrates optical spectra observed at the output beams of the lasers generated by the laser cavities with different angles of the AQWP.

The optical spectra of the laser output beams shown in FIG. 11 are generated from the laser cavity with four different angles θ of the AQWP. In the each panels of FIG. 11, the upper trace is depicted in a logarithmic scale, while the lower trace is depicted in a linear scale with an arbitrary unit. Again single-polarization lasers from the laser cavity with θ=0 rad or θ=±π/2 rad have quite different optical spectra compared to those of the two orthogonally polarized lasers with θ=±π/4 rad. The primary difference between them is their emission spectral shapes. The laser beams with two orthogonally-polarized components have the spectral bandwidth of 15 nm at full-width at half-maximum (FWHM) and the spectral powers decrease linearly from the maximum value. On the other hand, the single polarization lasers with θ=0 rad or θ=+π/2 rad have a wider spectral bandwidth of 26 nm and they are fitted well with a parabolic function, which is the characteristic spectral shape of the self-similar pulses in the normal-dispersion regime. The short wavelength spectrum around 1020 nm is filtered mainly by the FBG, while the long wavelength spectrum around 1050 nm is filtered by the AQWP.

Figure 12:
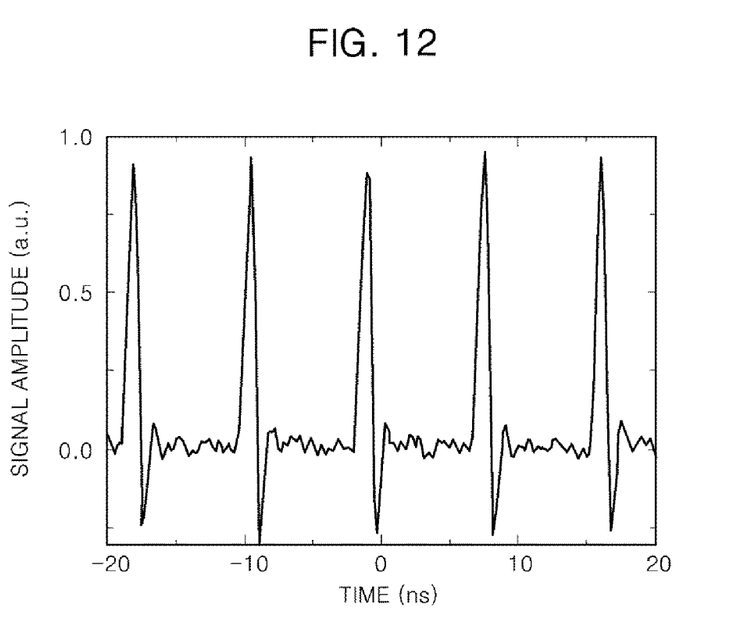
FIG. 12 illustrates sequent pulses of the laser output obtained by using a fast photo-diode and a digital oscilloscope with 1 GHz.
Figure 13:
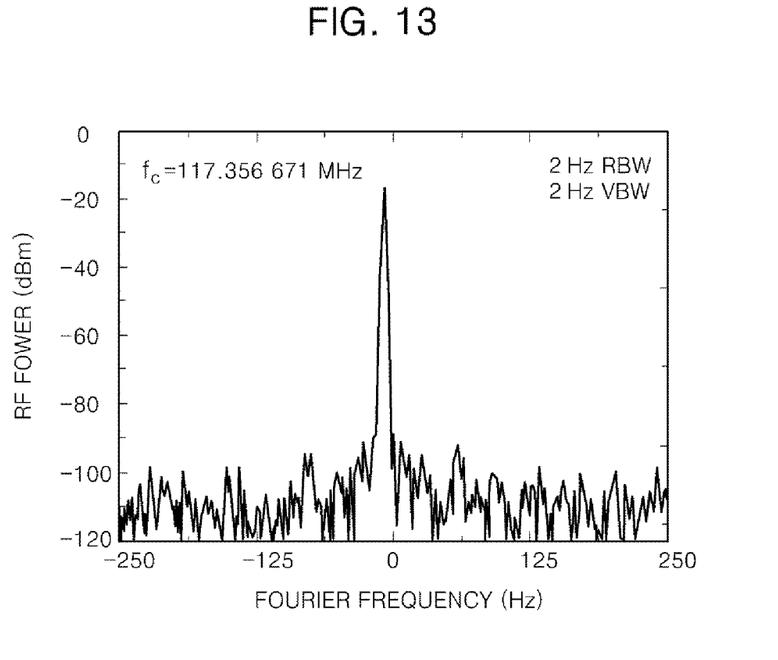
FIG. 13 illustrates a high resolution spectrum of the fundamental RF carrier frequency oscillating at the center frequency $f_c=117.356671$ MHz.
Figure 14:
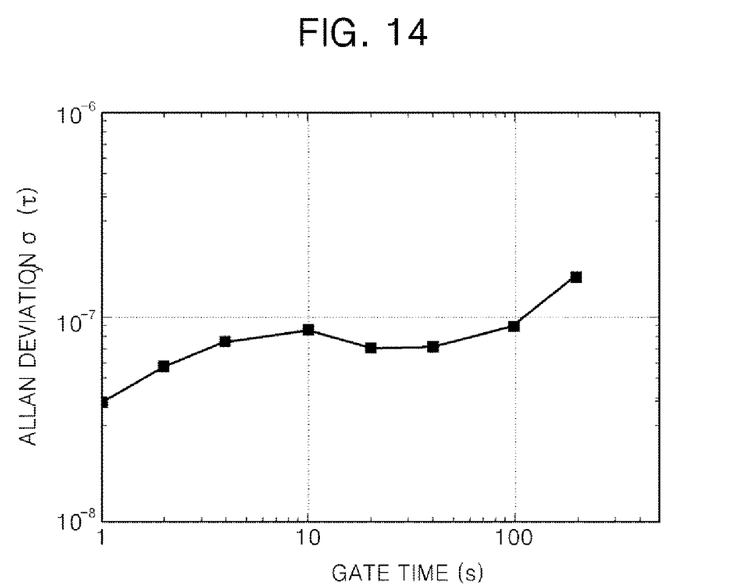
FIG. 14 illustrates an Allan deviation of the fundamental RF carrier frequency oscillating at the center frequency $f_c=117.356671$ MHz.
Figure 15:
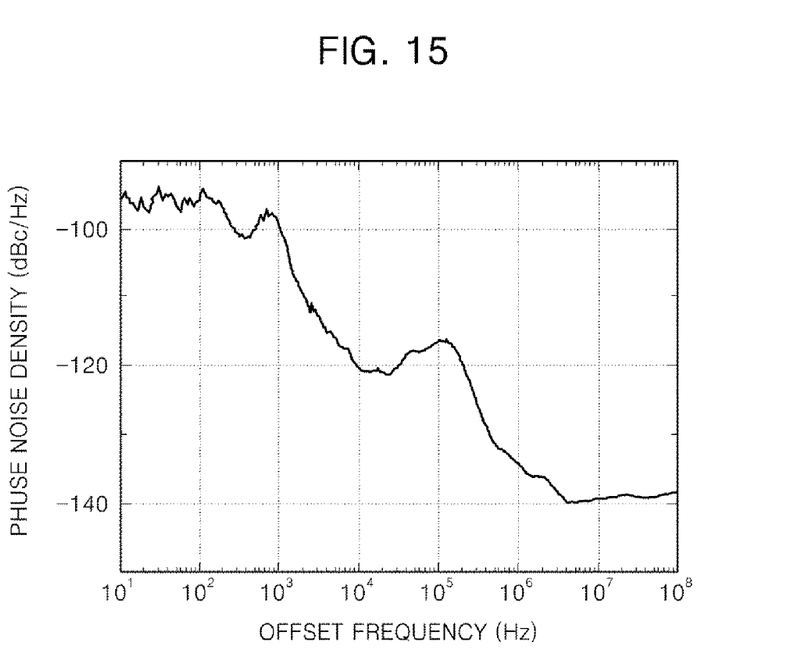
FIG. 15 illustrates an average phase noise spectral density of the fundamental RF carrier frequency oscillating at the center frequency $f_c=117.356671$ MHz.

Finally, the stability of the single-polarization picosecond Yb-doped optical fiber laser in the frequency and time domains are analyzed. FIG. 12 illustrates sequent pulses of the laser output obtained by using a fast photo-diode and a digital oscilloscope with 1 GHz. The regular pulse series with a pulse interval of 8.52 ns=1/$f_{rep}$ is observed with very low intensity fluctuations. It is also confirmed that the continuous-wave mode-locking of the laser without Q-switching can be achieved by recording the pulse series in a long-spanned time scale. A high resolution RF spectrum of the fundamental RF carrier frequency near the center frequency of fc=117.356671 MHz is shown in FIG. 13 with the RBW of 2 Hz. A high signal-to-noise ratio over 80 dB is observed without any spurious peaks at this noise level. The time domain stability of the fundamental RF carrier frequency can be evaluated by using the Allan deviation $\sigma_y(\tau)$. The measured Allan deviation is $3.8 \times 10^{-8}$ at 1-second averaging time as shown in FIG. 14. A slow drift up to the value of $2 \times 10^{-7}$ at 100-second gate time can be seen even though the laser generating device lies on the optical-table without any active environment stabilization. The ultra-stable nature of the RF carrier frequency is also manifested in its phase noise spectrum which is shown in FIG. 15. The phase noise spectral density has a ultra-low value of −95 dBc/Hz at 10 Hz offset frequency and decreases with the slope in proportion to $f^{-2}$ due to mainly a white frequency noise (or a random walk of phase) until the noise floor of −140 dBc/Hz at 4 MHz where a white phase noise dominates.

While the present invention has been shown and described with reference to certain exemplary embodiments thereof, the present invention shall not be limited to the specific exemplary embodiments, and it will be understood by those skilled in the art that various changes in form and details may be made therein without departing from the spirit and scope of the invention as defined by the appended claims.

The invention claimed is:

1. An optical fiber mode-locked laser generating device, comprising:
   a first pump laser generating unit for generating a pump laser with a predetermined wavelength;
   an optical fiber unit having an optical fiber of which a first region is formed of a Bragg grating from one end of an optical fiber in direction to the other end and of which a second region, the remaining part of the optical fiber, is doped with a gain material in a core of the optical fiber;
   a first optical coupling unit for providing a pump laser input from the pump laser generating unit to one end of the optical fiber unit, and outputting a mode-locked laser input from the optical fiber unit;
   a lens unit including a first lens configured to generate a parallelized laser by changing a path of the laser output from the other end of the optical fiber, and a second lens configured to focus the parallelized laser passed through the first lens on a certain area by changing a path of the parallelized laser;
   a polarization control unit including an achromatic quarter wave plate (AQWP) which is disposed between the first lens and the second lens and made by laminating two quarter wave plates (QWPs) such that a fast-axis of one QWP is orthogonal to a fast-axis of the other QWP, and controlling polarization of the parallelized laser and spectral filtering bandwidth by adjusting an angle of the AQWP with respect to a fast-axis or a slow-axis of the optical fiber unit; and a saturable absorbing unit saturably absorbing and reflecting the parallelized laser passed through the second lens.

2. The device of claim 1, wherein the gain material is selected from Ytterbium (Yb), Erbium (Er), and a composition of Yb and Er.

3. The device of claim 1, wherein the optical fiber forming the optical fiber unit is a single-mode polarization maintaining (PM) optical fiber.

4. The device of claim 1, wherein the angle of the polarization control unit is adjusted with respect to a plane orthogonal to a line connecting the centers of the first lens and the second lens.

5. The device of claim 1, wherein the polarization control unit is rotated about an optical path from the first lens to the second lens, and controls the polarization of the parallelized laser input from the first lens or the second lens.

6. The device of claim 1, wherein the polarization control unit controls the polarization of the parallelized laser input from the first lens or the second lens by changing a fast-axis of the AQWP with respect to the slow-axis of the optical fiber unit.

7. The device of claim 1, wherein the Bragg grating formed on the first region of the optical fiber unit is positively or negatively chirped.

8. The device of claim 1, wherein the saturable absorbing unit is a semiconductor saturable absorber mirror (SAM) with an anti-resonant multi-quantum-well structure.

9. The device of claim 1, wherein the saturable absorbing unit is attached on a piezo-electric transducer for minute adjustment of resonance length.

10. The device of claim 1, wherein the saturable absorbing unit is a saturable absorber reflection mirror coated with single-wall carbon nanotubes or diamond powder.

11. The device of claim 1, further comprising an optical amplifier amplifying a power of the laser,
wherein the optical amplifier includes:
a first light input unit coupled to the first optical coupling unit optically, and the laser output from the first optical coupling unit being input;
a light amplifying unit amplifying the laser input from the first light input unit;
a second pump laser generating unit generating and outputting a pump laser for amplifying with a predetermined wavelength;
a second optical coupling unit providing the pump laser for amplifying input from the second pump laser generating unit to the light amplifying unit, and outputting the laser input from the light amplifying unit.

12. The device of claim 11, wherein the gain material which is doped to a core of an optical fiber forming the light amplifying unit is selected from Ytterbium (Yb), Erbium (Er), and a composition of Yb and Er.

13. The device of claim 1, further comprising an optical converter converting pulse width of the laser,
wherein the optical converter includes:
a second light input unit the laser being input;
a light converting unit formed of two Bragg gratings and converting pulse width of the laser input from the second light input unit;
a light dividing unit providing the laser input from the second light input unit to the light converting unit, and outputting the laser input from the light converting unit; and
a light reflecting unit totally reflecting the laser output from the light converting unit.

14. The device of claim 2, wherein the optical fiber forming the optical fiber unit is a single-mode polarization maintaining (PM) optical fiber, and wherein the angle of the polarization control unit is adjusted with respect to a plane orthogonal to a line connecting the centers of the first lens and the second lens.

15. The device of claim 2, wherein the polarization control unit is rotated about an optical path from the first lens to the second lens, and controls the polarization of the parallelized laser input from the first lens or the second lens.

16. The device of claim 2, wherein the polarization control unit controls the polarization of the parallelized laser input from the first lens or the second lens by changing a fast-axis of the AQWP with respect to the slow-axis of the optical fiber unit.

17. The device of claim 2, wherein the Bragg grating formed on the first region of the optical fiber unit is positively or negatively chirped.

18. The device of claim 2, wherein the saturable absorbing unit is a semiconductor saturable absorber mirror (SAM) with an anti-resonant multi-quantum-well structure, and wherein the saturable absorbing unit is attached on a piezo-electric transducer for minute adjustment of resonance length.

19. The device of claim 2, wherein the saturable absorbing unit is a saturable absorber reflection mirror coated with single-wall carbon nanotubes or diamond powder.

20. The device of claim 11, further comprising an optical converter converting pulse width of the laser,
wherein the optical converter includes:
a second light input unit the laser being input;
a light converting unit formed of two Bragg gratings and converting pulse width of the laser input from the second light input unit;
a light dividing unit providing the laser input from the second light input unit to the light converting unit, and outputting the laser input from the light converting unit; and
a light reflecting unit totally reflecting the laser output from the light converting unit.

* * * * *